Nov. 25, 1924.     1,516,531
J. W. HALTEMAN ET AL
SAFE
Filed March 1, 1923

Inventors:-
John W. Halteman and
William Ryter.
By Donald U. Rich
Attorney

Patented Nov. 25, 1924.

1,516,531

UNITED STATES PATENT OFFICE.

JOHN W. HALTEMAN AND WILLIAM RYTER, OF PHILADELPHIA, PENNSYLVANIA.

SAFE.

Application filed March 1, 1923. Serial No. 622,197.

*To all whom it may concern:*

Be it known that we, JOHN W. HALTEMAN and WILLIAM RYTER, both citizens of the United States of America, residing at Philadelphia, in the county of Philadelphia and State of Pennsylvania, have invented certain new and useful Improvements in Safes, of which the following is a specification.

This invention relates to safes and has for its primary object the provision of improvements tending to preserve the same against serious damage by explosives while at the same time preserving the safe against the damaging influences of fire and water.

A still further object of this invention is the provision of improvements for safes, vaults, or the like whereby any person accidently imprisoned therein may manually operate the same to permit the entrance of air into the safe and thus prevent suffocation.

Figure 1:
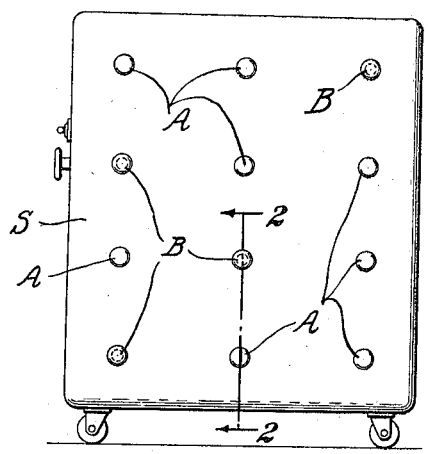
Figure 2:
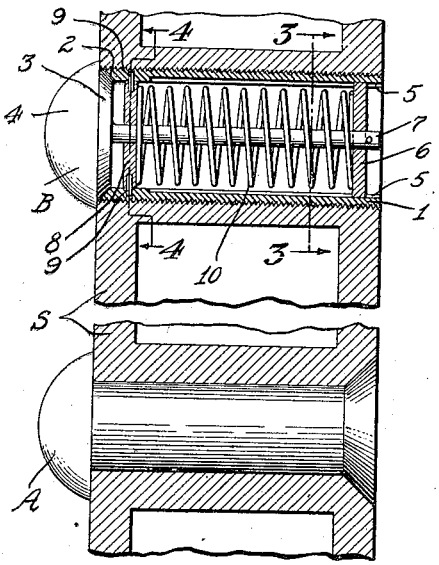
Figure 3:
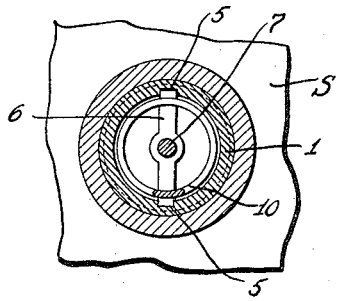
Figure 5:
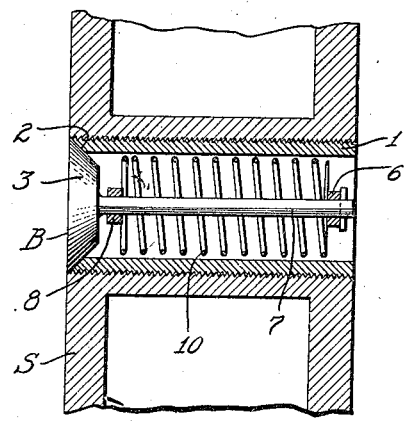
Figure 4:
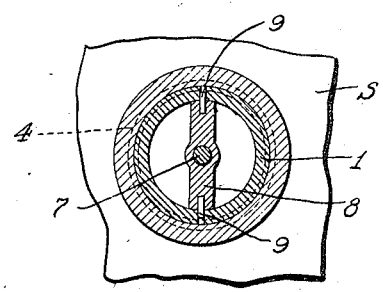

Other objects and advantages of this invention will be apparent from the following description when read in conjunction with the accompanying drawings in which drawings:

Figure 1 is a face view of one of the side walls of a conventional type of safe, Fig. 2 is a sectional view taken on the line 2—2 of Fig. 1, Fig. 3 is a sectional view taken on the line 3—3 of Fig. 2, Fig. 4 is a sectional view taken on the line 4—4, Fig. 2, and Fig. 5 is a sectional view of a modified form.

Referring now, more particularly to the drawings, S indicates a steel side wall of a conventional type of safe the safe being provided with a plurality of apertures some of which are provided with the usual bolts or rivets A, and others being provided with "dummy" bolts or rivets B, the latter forming the subject matter of the present application.

The bores constituted by the apertures which receive the "dummy" rivets B are threaded for engagement by complementary exteriorly threaded tubes 1, the latter serving as holders for valves to be presently described.

Each tube 1 is provided at its outer end with a beveled portion 2 forming a seat for a valve 3, the fitting of the valve 3 to its seat 2 being preferably a machined fit to avoid the use of packing while at the same time affording a sealing engagement between the parts. The valve 3 is provided with an enlarged head 4, corresponding in size to the heads of bolts or rivets A, and preferably of greater diameter than the tube 1; the head 4, when in position, as shown in Fig. 2, entirely covering the end of tube 1.

The inner face of each tube 1 is provided with oppositely arranged machined grooves 5 which terminate short of the valve seat 2 and serve as guideways for a positioning supporting element, or valve stem guide 6, the latter being rigidly secured to the free end of a valve stem 7. The other end of valve stem 7 is secured in any suitable manner, or if desired may be formed integral with, the inner face of the valve 3.

The valve stem 7 is also guided in its movement by a guide element 8, rigidly secured within the tube 1 near the valve seat 2, by means of pins 9 or the like, the stem 7 working through a central aperture in an obvious manner.

Encircling the valve stem 7 and supported between and by the guide elements 6 and 8 is a coil spring 10 which normally retains the valve 3 on its seat 2.

As shown more clearly in Figs. 3 and 4, the guide elements 6 and 8, are relatively narrow strips, thus leaving the greater part of the tube freely accessible.

It is further to be noted that the valve stem 7, extends substantially through the wall S of the safe, in such a position that a person could unseat the valve 3 by forcing the stem outwardly against the tension of the spring 10.

In the modified form of device shown in Fig. 5, the enlarged head shown at 4 in Fig. 2 is dispensed with, because of the fact that in some conventional types of safes the rivets or bolts used therein are not provided with the enlarged head shown at A in Figs. 1 and 2.

Mention has heretofore been made of the close fitting engagement of the valves 3 on their seats 2 to prevent the admission of fire or water to the interior of the safe, and it will be understood that should an attempt be made to blow open the safe through the medium of explosives, the gases will pass through the tubes 1 forcing the valves 3 away from their seats thus opening the tubes 1 to the atmosphere (likewise the interior of the safe) and permitting the gases to escape and relieving the pressure on the interior of the safe.

What we claim as new and desire to secure by Letters Patent of the United States is:

1. A safe having an opening, a valve adapted to close said opening and provided with a head of greater diameter than said opening, a valve stem, means secured to said valve stem for restraining the valve against rotation but permitting longitudinal movement, and spring means normally retaining the valve in seated position.

2. A safe having an opening, a tube rigidly secured therein and having a valve seat at one end thereof, a valve adapted to close said tube and provided with a head of greater diameter than the before mentioned opening, a valve stem secured to the valve and extending the full length of said tube, means in said tube cooperating with said valve stem whereby said valve stem and valve are secured against rotation, and spring means normally urging said valve to seated position.

3. A safe having an opening therein, a tube rigidly secured in said opening and provided with oppositely arranged grooves and a beveled end, a valve adapted to seat in said beveled end and close said tube, a head secured to said valve and overlapping the before mentioned tube, a valve stem, guide elements for said valve stem, and spring means positioned within said tube and normally retaining the valve in seated position.

4. A safe having an opening therein, a tube rigidly secured within said opening and provided with oppositely arranged grooves and a beveled end, a valve adapted to seat in said beveled end and close said tube, a valve stem, a guide secured to said valve stem and movable within the before mentioned grooves, a guide rigidly secured within the tube adjacent the beveled end, and spring means supported by the above mentioned guides and normally retaining the valve in seated position.

In testimony whereof we hereby affix our signatures.

JOHN W. HALTEMAN.
WILLIAM RYTER.